(12) United States Patent
Hamblin et al.

(10) Patent No.: US 7,055,548 B2
(45) Date of Patent: Jun. 6, 2006

(54) CONTROL VALVE TRIM AND SEAT DESIGN FOR VALVE TRIM WITH MINIMAL UNBALANCED AREA

(75) Inventors: Nathan J. Hamblin, Marshalltown, IA (US); Ted A. Long, Sugarland, TX (US)

(73) Assignee: Fisher Controls International LLC, St. Louis, MO (US)

( * ) Notice: Subject to any disclaimer, the term of this patent is extended or adjusted under 35 U.S.C. 154(b) by 115 days.

(21) Appl. No.: 10/449,641

(22) Filed: May 30, 2003

(65) Prior Publication Data

US 2004/0238050 A1 Dec. 2, 2004

(51) Int. Cl.
*F16K 47/04* (2006.01)

(52) U.S. Cl. .................................. 137/625.37
(58) Field of Classification Search .............. 137/625.3, 137/625.37
See application file for complete search history.

(56) References Cited

U.S. PATENT DOCUMENTS

| | | | | |
|---|---|---|---|---|
| 3,252,480 A | * | 5/1966 | Odendahl et al. | 137/625.3 |
| 3,469,591 A | | 9/1969 | Odendahl | |
| 3,971,411 A | * | 7/1976 | Baumann | 137/625.3 |
| 3,987,809 A | | 10/1976 | Baumann | |
| 4,044,992 A | | 8/1977 | Jukoff | |
| 4,479,509 A | * | 10/1984 | Dear et al. | 137/560 |
| 4,860,993 A | * | 8/1989 | Goode | 251/127 |
| 5,615,708 A | | 4/1997 | Barron | |
| 5,618,025 A | | 4/1997 | Barron et al. | |
| 5,765,814 A | | 6/1998 | Dvorak et al. | |
| 5,803,119 A | * | 9/1998 | Steinke | 137/625.37 |
| 6,003,551 A | | 12/1999 | Wears | |
| 6,701,957 B1 | | 3/2004 | McCarty et al. | |

FOREIGN PATENT DOCUMENTS

DE    296 20 122    1/1997

OTHER PUBLICATIONS

International Search Report issued for PCT/US2004/006368 on Jun. 30, 2004.
Written Opinion issued for PCT/US2004/006368 mailed on Jul. 9, 2004.
Patent Abstracts of Japan, vol. 1996, No. 4, JP 7 317920, Yamatake Honeywell Co. Ltd., Dec. 8, 1995.
Patent Abstracts of Japan, vol. 0101, No. 93, JP 61 038272, Yamatake Honeywell Co. Ltd., Feb. 24, 1986.
Mechanical drawing of product publicly available more than one year before May 30, 2003.
78200/18200 Series LINCOLNLOG™ Valves Anti–cavitation High Pressure Control Valves, Masoneilan, Oct. 1997.
78200 Series LINCOLNLOG™ High Pressure Control Valve Instructions, Rev. A, Masoneilan, Jun. 1989.
"Yarway® brochure —Turbo–Cascade® high pressure control valve" (1973).

* cited by examiner

*Primary Examiner*—John Fox
(74) *Attorney, Agent, or Firm*—Marshall, Gerstein & Borun LLP

(57) ABSTRACT

A fluid control valve trim and seat with a valve plug of a radius of about 0.03 inch, when used in conjunction with a valve seat angle of about 75°, results in minimal unbalance area. The valve trim is provided with pairs of anti-cavitation notches. The notches are arranged such that notches of each given pair are angled with respect to one another, and may be further arranged such that adjacent pairs of notches are off-set relative to one another, so as to increase the time fluid spends in the plenum, resulting in proper staging and controlled pressure drop as fluid passes through the valve.

18 Claims, 6 Drawing Sheets

CONTROL VALVE TRIM AND SEAT DESIGN FOR VALVE TRIM WITH MINIMAL UNBALANCED AREA

FIELD OF THE DISCLOSURE

This disclosure relates generally to fluid control valves and, more particularly, to improvements in the trim and seat design of fluid control valve plugs.

BACKGROUND

There have been efforts made to design a valve trim or profile having symmetrically placed notches therein to define a preferred flow path for fluid within the valve. Typical of such efforts are the anti-cavitation trims of the LINCOLNLOG™ valves of Masoneilan/Dresser Industries, Inc. Anti-cavitation trims stage pressure drops through a control valve. These valves have suffered from a number of shortcomings. For example, the notch locations are, at least in some cases, too close to one another to provide proper staging. As a result, fluid within the valve is able to flow from one restriction to the next without utilizing the interstage plenum, as intended, which is necessary to achieve desired staging so as to avoid cavitation. This problem is referred to herein as "short-circuiting."

Another shortcoming is that these valves, when used with conventional plug tips, do not direct fluid away from the seating surfaces of the plug so as to minimize unbalance forces in the region of the seating surfaces. It would be desirable if the unbalance forces, produced by the fluid pressure drop in the valve, could be reduced, and one manner of reducing the unbalance forces is to minimize the unbalance area in the vicinity of the seating surfaces of the plug.

The manner in which these and other shortcomings are overcome are explained in the following Summary and Detailed Description of the Preferred Embodiments.

SUMMARY

In order to provide an anti-cavitation trim that avoids short-circuiting of fluid to subsequent stages within a valve, it is effective to provide pairs of notches at rotated locations along the valve plug. In particular, instead of positioning notches of a given pair (i.e. the two notches at a given height along the valve plug) directly parallel with one another, the notches are positioned such that they are at an acute angle to one another. Each pair of notches thus forms a wedge-shape, with a distance δ separating the two notches at the narrowest part of the wedge. The distance δ, while preferably small, is also preferably an easily machinable dimension for facilitating manufacture. This arrangement of notches advantageously forces fluid within the valve to travel through more of the plenum space, and thus spend more time in the plenum, thereby allowing the fluid to recover pressure prior to entering the next stage.

Another improvement is to employ a plug tip having a radius of about 0.03 inch, and preferably 0.031 inch, which forms a seat ring angle in the range of about 70–75°, and most preferably, 75°, from a plane normal to a longitudinal axis of the valve plug. It is also desirable for the valve plug to have a trim that directs flow away from the seating surfaces of the plug and seat ring. It is found that this plug tip radius and seat ring angle result in a very small unbalance area, on the order of an approximately 90% reduction in unbalance area as opposed to anti-cavitation trim plugs without such plug tip dimensions, which minimizes unbalance forces produced by the fluid pressure drop within the valve. Advantageously, this feature minimizes actuator thrust requirements at elevated pressure drops.

In addition, the plug tip radius and seat ring angle produce relatively high seating stress levels, which advantageously achieve extremely tight shutoff leakage performance, thereby minimizing leakage. The plug seating surface is also favorably protected against impinging fluid and entrained particulate and other debris, thereby increasing the service life of the trim and ensuring that even after long use, the valve plug and seat ring will continue to exhibit tight shutoff performance. The increased contact stress efficiency achieved also desirably minimizes actuator thrust requirements.

DETAILED DESCRIPTION OF THE PREFERRED EMBODIMENTS

Figure 1:
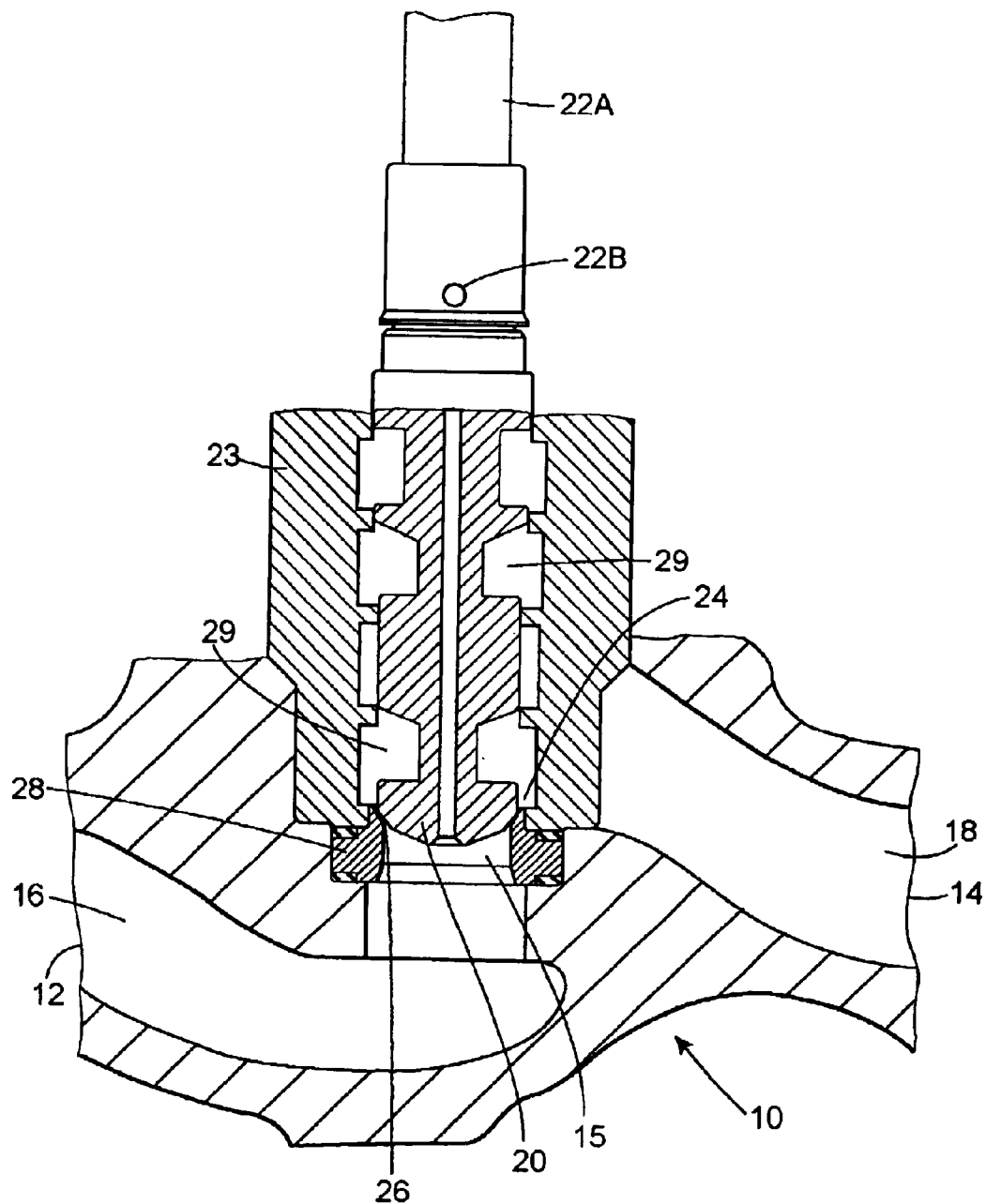
FIG. 1 is a fragmented sectional view of a conventional fluid control valve with an anti-cavitation trim.

FIG. 1 shows a conventional valve 10 with an anti-cavitation trim. The valve 10 includes a fluid inlet 12, a fluid outlet 14, and a fluid inlet passageway 16 which couples the fluid inlet 12 through an orifice 15 to a fluid outlet passageway 18. The valve 10 is of the flow-up variety, in which the fluid inlet 12 and fluid inlet passageway 16 are disposed at a lower level than the fluid outlet 14 and fluid outlet passageway 18. A valve plug 20 is connected via a valve stem 22A to an actuator, which is not shown, but which would be positioned above the valve stem 22A. One or more apertures 22B are provided near the top of the valve plug 20 to receive, for example, a groove pin (not shown) to secure the valve plug 20 to the valve stem 22A. A cage 23 is positioned in the fluid flow path to influence desired characteristics of the fluid flow. An outer surface 24 of the valve plug 20 contacts a surface 26 of a seat ring 28, with the surface 26 of the seat ring 28 forming a valve seat for the valve plug 20.

In an effort to prevent cavitation within the valve 10, it is desirable to provide an anti-cavitation trim. An anti-cavitation trim may utilize a plurality of symmetrically placed notches 29 to define a staged flow path. The notches 29 are provided to facilitate keeping fluid flowing past the seat ring 28 at a relatively high pressure, and gradually allowing the pressure to decrease as the fluid reaches higher stages.

In operation, the actuator selectively moves the valve stem 22A, and thus moves the valve plug 20, downwardly towards, and upwardly away from, the seat ring 28 in order to respectively close and open the valve 10. Because the position of the valve plug surface 24 with respect to the surface 26 of the seat ring 28 determines the rate at which fluid flows between the valve plug 20 and the seat ring 26, controlling the relative position of the valve plug surface 24 and surface 26 of the seat ring 28 can, to an extent, control the rate at which fluid flows through the valve 10.

However, due to the geometrical shape of the valve plug surface 24 along its area of contact with the surface 26 of the seat ring 28, fluid passing through the orifice 15 from the inlet passageway 16 toward the outlet passageway 18 is not directed away from the seating surfaces 24, 26 of the valve plug 20 and seat ring 28 to a satisfactory extent in order to optimally minimize unbalance forces in the region of the seating surfaces 24, 26.

Also, due to the proximity of the notches 29 to one another, there is a problem of the fluid short-circuiting, i.e. passing from one restriction to the next without making use of the interstage plenum, resulting in the pressure dropping too quickly and thus not sufficiently avoiding cavitation.

In the remaining drawing figures, like reference numbers are utilized to refer to those features shared among the conventional valve 10 described above and the preferred embodiments of the present disclosure.

Figure 2:
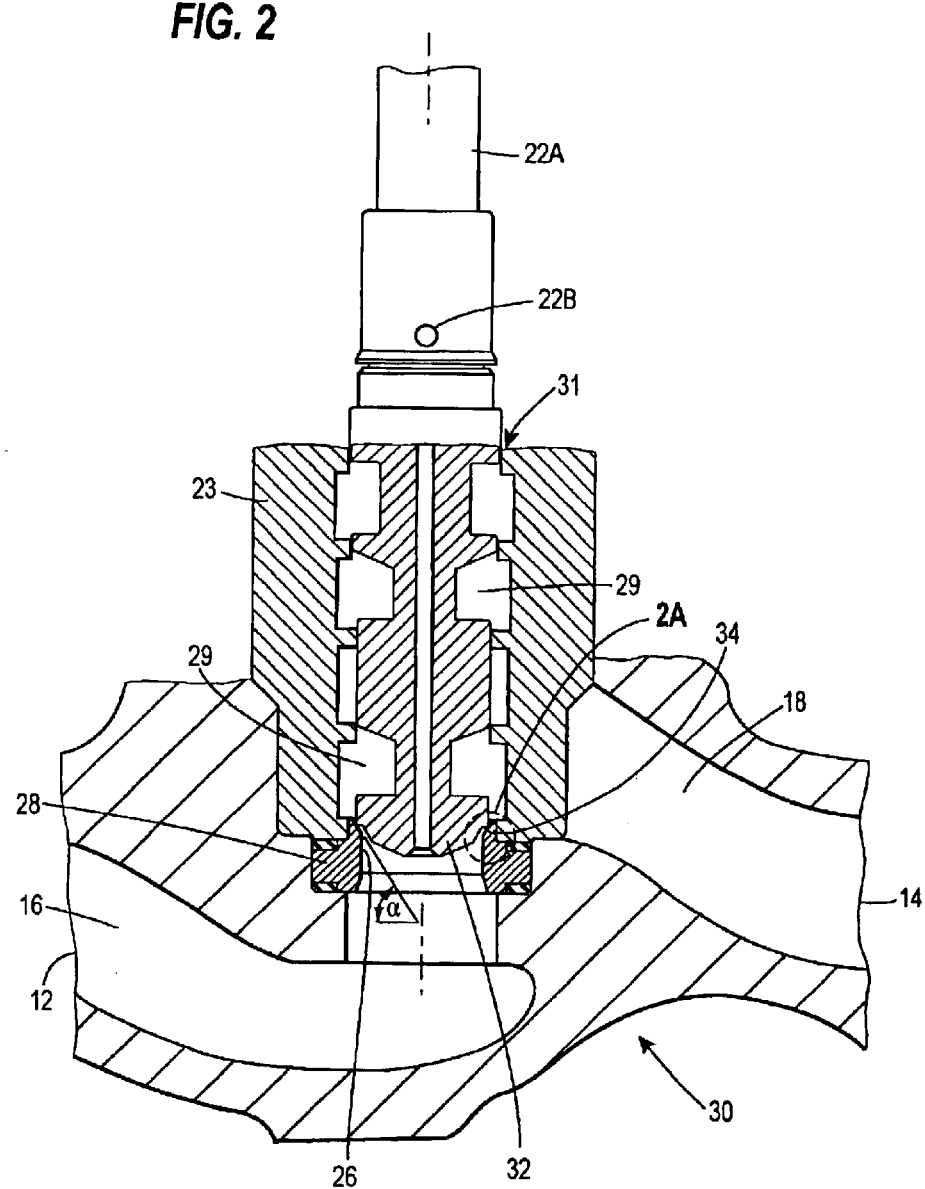
FIG. 2 is a fragmented sectional view of a fluid control valve with an anti-cavitation trim having a plug tip and seat ring angle in accordance with an embodiment of this disclosure.
Figure 2A:
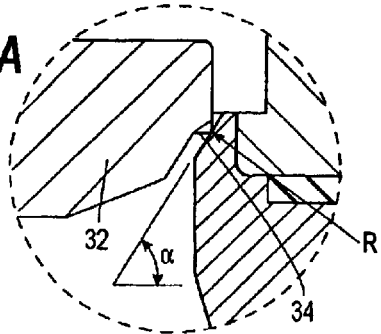
FIG. 2A is an enlarged sectional view taken along line 2A of FIG. 2.
Figure 3:
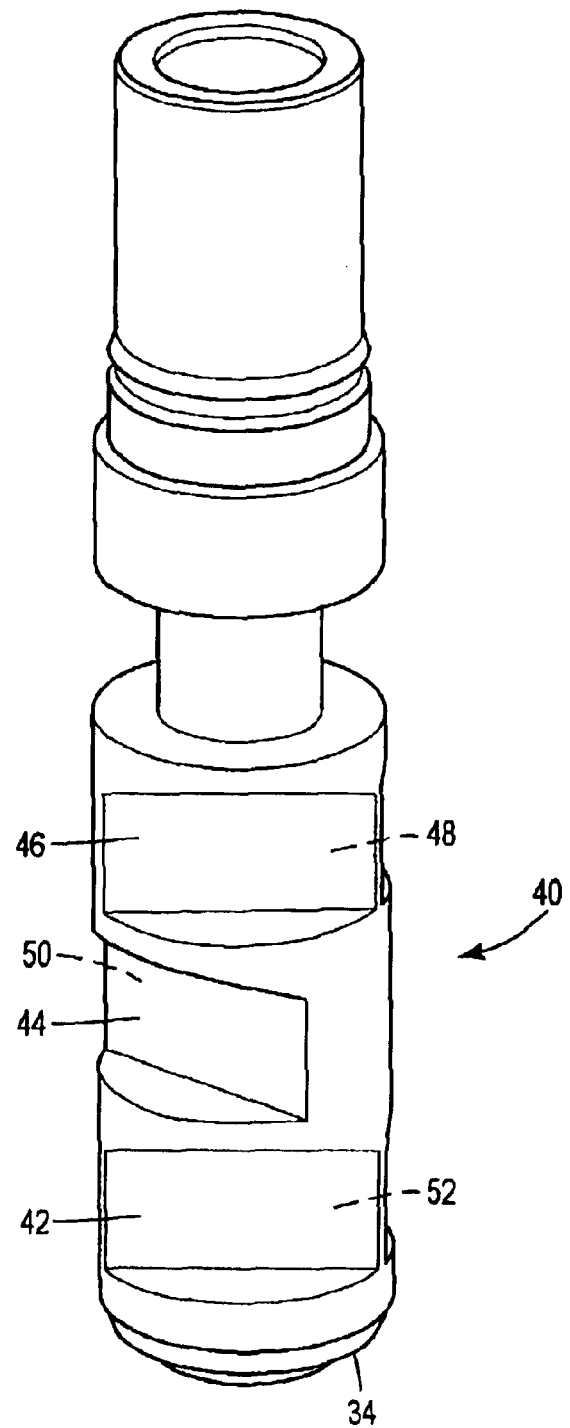
FIG. 3 is an elevated perspective view of a valve trim having a rotated notch arrangement in accordance with another embodiment of this disclosure.
Figure 4:
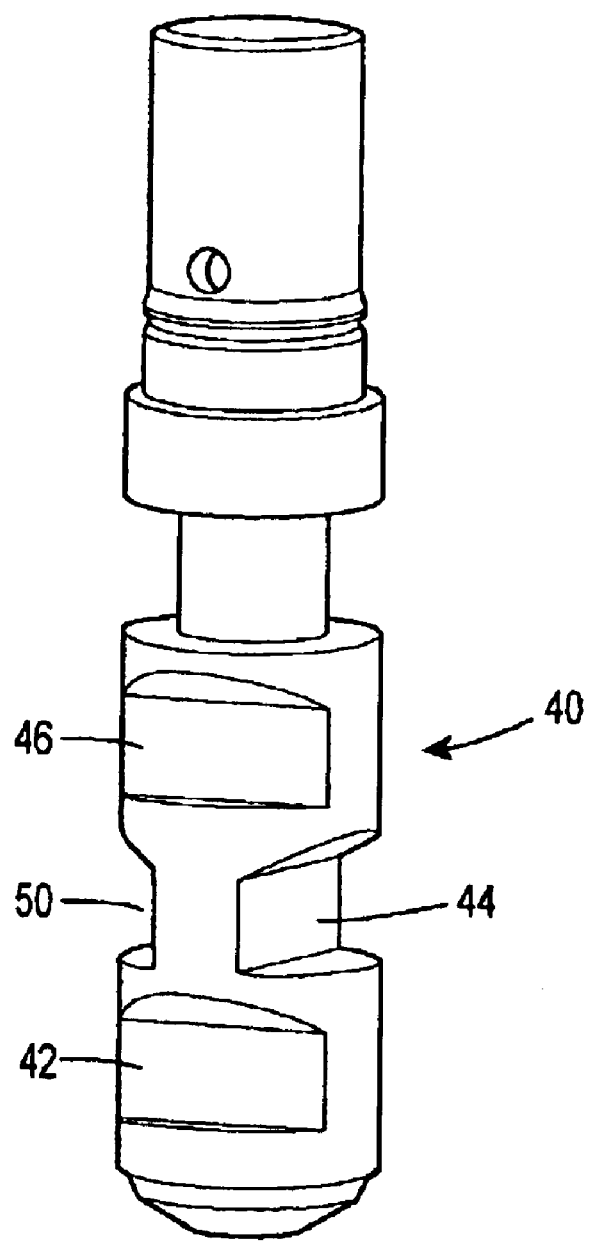
FIG. 4 is a perspective view of the valve trim shown in FIG. 3, taken from a lower elevation than that of FIG. 3.
Figure 5:
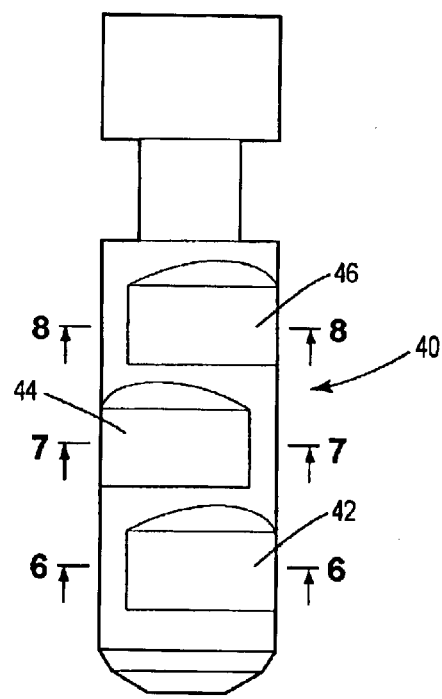
FIG. 5 is a front plan view of the valve trim shown in FIG. 3.
Figure 6:
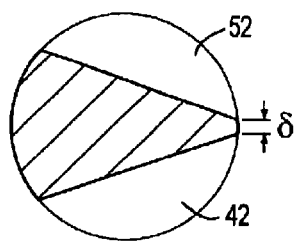
FIG. 6 is a cross-sectional view taken along lines 6—6 of FIG. 5.
Figure 7:
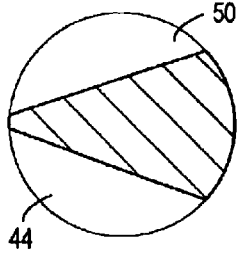
FIG. 7 is a cross-sectional view taken along lines 7—7 of FIG. 5.
Figure 8:
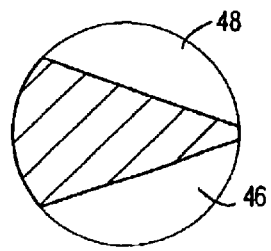
FIG. 8 is a cross-sectional view taken along lines 8—8 of FIG. 5.

In FIG. 2, a valve 30 is shown in which a valve trim 31 includes a valve plug 32 having a valve plug surface 34 with a particularly advantageous geometric shape, implemented in order to reduce the unbalance forces in the region of seating surfaces associated with the valve plug 32. The valve plug 32 has a plug tip 34 having a radius of preferably about 0.03 inch, and more preferably, 0.031 inch. The surface 26 of the seat ring 28 is preferably angled about 75° from a plane normal to a longitudinal axis of the valve plug 32. This angle, referred to generally herein as a seat ring angle "α" of about 75°, in combination with the plug tip 34 having a radius of about 0.03 inch, and more preferably, 0.031 inch, advantageously directs fluid flow away from the seating surfaces of the valve plug 32 and seat ring 28, which results in a significantly reduced unbalance area, thereby minimizing unbalance forces produced by the fluid pressure drop. FIG. 2A is an enlargement of the region of the radius R of the plug tip 34 of the valve plug 32.

This combination of the 75° seat ring angle a and the radius R of the plug tip of about 0.03 inch, and more preferably, 0.031 inch, is also found to result in an extremely tight shutoff when the valve plug 32 is closed, thereby improving resistance to leakage resulting from high seating stress levels, when compared to conventional valve plug and seat ring arrangements such as that shown in FIG. 1. The unbalance area is also reduced by approximately 90% as compared to such conventional valve plug and seat arrangements by utilizing the combination of the 75° seat ring angle α and the radius R of the plug tip of about 0.03 inch. Such a substantial reduction in the unbalance area greatly reduces the actuator thrust requirements for elevated pressure drops. By reducing the area of contact between the plug tip 34 and seat ring 28, there is increased contact stress efficiency, which further minimizes actuator thrust requirements.

The further employment of an anti-cavitation trim on the valve 30, such as the utilization of notches 29 spaced along the valve plug 32 enhances the tight shutoff, and also advantageously provides the combined benefits of a reduced unbalance area in a valve with a staged flow path. The enhanced shutoff tightness is particularly advantageous because it serves not only to prevent leakage, but also to protect the plug seating surfaces from impinging fluid, as well as from entrained particulate and other debris, thereby increasing the installed life of the valve 30. It is recognized that the plug tip 34 may be used with a conventional valve plug 20 such as that shown in FIG. 1, which shares the same arrangement of notches 29 as the valve shown in FIG. 2.

Figure 9:
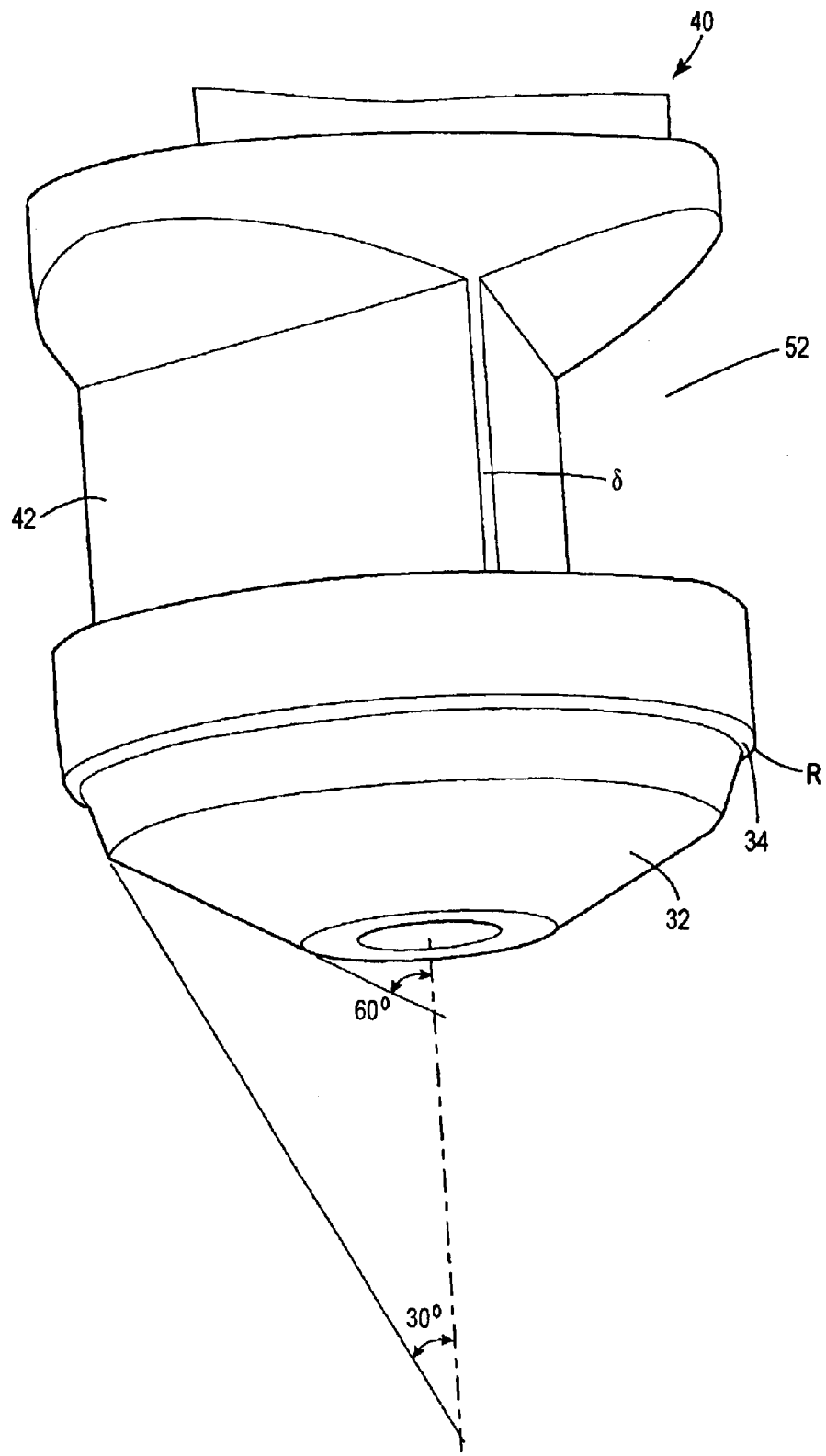
FIG. 9 is an enlarged perspective view, broken away, of the valve trim shown in FIGS. 3–5, taken from a lower elevation than that of FIG. 4.

FIGS. 3–9 show an alternate embodiment for a valve trim 40. The details of the plug tip 34 of a radius R of about 0.03 inch, and more preferably, 0.031 inch, and the relationship to a valve seat (not shown in FIGS. 3–9) having a ring angle α of about 75°, are the same for this embodiment as in the embodiment shown in FIG. 2, as best shown in FIG. 9. Another feature in the detail of the plug tip 34 best shown in FIG. 9 is the stepped-slope geometry of the plug tip 34 in a region beyond the plug tip radius R that selectively engages the seat ring (below the plug tip radius R shown in FIG. 9).

A first portion of this region of the plug tip 34 beyond the plug tip radius R forms a first angle of preferably about 30° from a longitudinal axis of the valve plug 32. A more distal second portion of this region of the plug tip 34 beyond the plug tip radius R has a more gradual slope than the first portion, and forms a second angle of preferably about 60° from the longitudinal axis of the valve plug 32. This stepped-slope region of the plug tip 34 advantageously enhances the direction of flow away from the seating surfaces of the valve plug 32 and seat ring 28. By directing the flow away from the seating surfaces, a significantly reduced unbalanced area is achieved and unbalanced forces produced by the pressure drop are minimized.

To overcome the problem of short-circuiting experienced with anti-cavitation valve trims, the embodiment of FIGS. 3–9 advantageously provides a plurality of notches 42, 44, 46, 48, 50, 52 disposed at locations rotated relative to the notches 29 of conventional anti-cavitation trims shown in FIG. 1. Each pair of notches of a given elevation, for example notches 42, 52, are disposed at an acute angle to one another, forming a wedge-shape, rather than parallel to one another as are notches of conventional anti-cavitation trims. A distance δ separates the two notches 42, 52 of each pair at the narrowest part of the wedge-shape, as best shown in the cross-sectional view of FIG. 6. Preferably, the distance δ is a small but reasonably machinable dimension.

Each pair of notches along the valve trim 40 is preferably rotated relative to the adjacent pair or pairs of notches, as best shown in FIGS. 3–8, such that the distance δ separating the narrowest part of the wedge-shape formed by notches 42, 52 is offset 180° from the narrowest part of the wedge-shape formed by the adjacent, next-higher pair of notches 44, 50. Furthermore, the narrowest part of the wedge-shape formed by the pair of notches 46, 48 is offset 180° from the narrowest part of the wedge-shape formed by the pair of notches 44, 50. Thus, the notches 46, 48 are arranged in the same orientation as the notches 42, 52. Fewer or additional pairs of notches, as well as other relative orientations, such as offsets other than 180°, may be provided instead.

This rotated, wedge-shaped arrangement of notches 42, 44, 46, 48, 50, 52 results in fluid passing from the inlet passageway 16 to the outlet passageway 18 to spend more time in the plenum as compared to conventional anti-cavitation trims. By spending more time in the plenum, the fluid is better able to recover pressure prior to entering the next stage, which reduces cavitation.

Alternatively, the angled notches 42–52 may be positioned independently or in combination as pairs of notches, or even alternate between independent notches and pairs of notches, in either a repeating or non-repeating pattern, to provide maximum expansion and pressure recovery prior to proceeding to the next stage. This advantageously provides an enhanced ability to achieve desired pressure staging. For example, instead of in all angled notches 42–52 being arranged in pairs, they could be arranged such that at a first level of the valve trim (corresponding to a first stage) there is a pair of notches 42, 52, at a second level of the valve trim (corresponding to a second stage) there is another pair of notches, 44, 50, at a third level of the valve trim (corresponding to a third stage) there is only a single notch 46, with no other notch at that third level, and at a fourth level of the valve trim (corresponding to a fourth stage), there again could be a pair of notches. This might be described as a "2-2-1-2" arrangement of notches, wherein the numbers indicate the number of notches provided at each respective level.

Thus, a "2-1-2-1" arrangement would indicate a pair of notches 42, 52, at the first level, a single notch 44 at the second level, a pair of notches 46, 48 at the third level, and a single notch at the fourth level. Preferably, the notches at the levels including only a single notch would still be arranged askew, i.e. at an acute angle, with respect to the notches of at least one of the next-higher and next-lower levels.

While the notches 42–52 are preferably angled and the orientation of adjacent pairs of notches preferably alternate in the manner described, the valve plug 32 may still have a random orientation relative to the cage 23 (not shown in FIGS. 3–9). Advantageously, by achieving more reliable and more gradual pressure staging, certain restrictions typically utilized in a fluid flow system in which control valves are utilized may be relaxed, or opened up, at least slightly, thereby producing a higher capacity valve without sacrificing pressure drop capabilities.

Although this disclosure focuses on certain preferred embodiments, it is not intended to be so limiting. Variations may be made to the embodiments described herein without departing from the scope of the present disclosure and that are still within the scope of the appended claims. For example, the valve could be a flow-down valve or other type of valve, rather than the flow-up valve as shown in the drawings.

We claim:

1. A valve for controlling the rate of flow of fluid comprising:
    (a) a body having a fluid inlet, an inlet passageway in communication with the fluid inlet, an outlet passageway, a fluid outlet in communication with the outlet passageway, a conduit coupling the inlet passageway and the outlet passageway;
    (b) a seat ring disposed about the conduit;
    (c) a valve trim including a valve plug and a plug tip, the valve trim including a plurality of anti-cavitation notches therein, at least two of the plurality of anti-cavitation notches being arranged at an acute angle to one another, wherein the valve trim includes two or more levels of notches in the valve trim, and wherein at least one of said levels of the valve trim includes a pair of the notches, said notches of the pair forming a wedge shape, and being separated from one another at a narrowest part of the wedge-shape.

2. The valve of claim 1, wherein the seat ring is disposed at an angle of about 75° from a plane extending through a longitudinal axis of the valve plug.

3. The valve of claim 1, wherein the plug tip has a radius of about 0.03 inch.

4. The valve of claim 1, wherein the plug tip has a radius of 0.031 inch.

5. A valve for controlling the rate of flow of fluid comprising:
    (a) a body having a fluid inlet, an inlet passageway in communication with the fluid inlet, an outlet passageway, a fluid outlet in communication with the outlet passageway, a conduit coupling the inlet passageway and the outlet passageway;
    (b) a seat ring disposed about the conduit;
    (c) a valve trim including a valve plug and a plug tip, the valve trim including a plurality of anti-cavitation notches therein, at least two of the plurality of anti-cavitation notches being arranged at an acute angle to one another, wherein the valve trim includes two or more levels of notches in the valve trim, and wherein a plurality of the levels of the valve trim include pairs of the notches and wherein the notches in the pairs of notches at each of said plurality of levels are disposed at an acute angle to one another, whereby said notches of each said pair of notches form a wedge-shape.

6. The valve of claim 5, wherein the notches in said plurality of pairs of notches are separated from one another at a narrowest part of the wedge-shape.

7. The valve of claim 5, wherein both notches of at least one of said pairs of notches are off-set relative to both notches of an adjacent of said pairs of notches.

8. The valve of claim 5 wherein a narrowest part of the wedge-shape of said at least one pair of notches is off-set 180° relative to a narrowest part of the wedge-shape of the adjacent of said pairs of notches.

9. A valve trim for a valve comprising a valve plug and a plug tip, the valve trim including a plurality of anti-cavitation notches therein, the plurality of anti-cavitation notches are arranged in at least one pair of said notches along a length of the valve trim, and wherein the notches in the at least one pair of notches are disposed at an acute angle to one another, whereby said notches form a wedge-shape.

10. The valve trim of claim 9, wherein the notches in said at least one pair are separated from one another at a narrowest part of the wedge-shape.

11. The valve trim of claim 9, including a plurality of pairs of the notches and wherein the notches in the plurality of said pairs of notches are disposed at an acute angle to one another, whereby said notches of each said pair of notches form a wedge-shape.

12. The valve trim of claim 11, wherein the notches in said plurality of pairs of notches are separated from one another at a narrowest part of the wedge-shape.

13. The valve trim of claim 11, wherein at least one of said pairs of notches is off-set relative to an adjacent of said pairs of notches.

14. The valve trim of claim 11 wherein a narrowest part of the wedge-shape of said at least one pair of notches is off-set 180° relative to a narrowest part of the wedge-shape of the adjacent of said pairs of notches.

15. The valve trim of claim 9, wherein the plug tip has a radius of about 0.03 inch.

16. The valve trim of claim 9, wherein the plug tip radius is 0.031 inch.

17. The valve trim of claim 9, the plug tip having a plug tip radius that selectively engages the seat ring and a stepped-slope region beyond a plug tip radius, the stepped slope region including a first portion adjacent the plug tip radius, said first portion having a first angle relative to a longitudinal axis of the valve plug, and a second portion having more gradual slope than the first portion, said second portion located more distal to the plug tip radius than the first portion and having a second angle relative to the longitudinal axis of the valve plug, whereby the stepped-slope region serves to direct flow away from at least two seating surfaces defined by the plug tip radius and the seat ring.

18. The valve of claim 17, wherein the first angle relative to a longitudinal axis of the valve plug is about 60°, and wherein the second angle relative to a longitudinal axis of the valve plug is about 30°.

* * * * *

UNITED STATES PATENT AND TRADEMARK OFFICE
CERTIFICATE OF CORRECTION

| | | |
|---|---|---|
| PATENT NO. | : 7,055,548 B2 | Page 1 of 1 |
| APPLICATION NO. | : 10/449641 | |
| DATED | : June 6, 2006 | |
| INVENTOR(S) | : Nathan J. Hamblin et al. | |

It is certified that error appears in the above-identified patent and that said Letters Patent is hereby corrected as shown below:

On the Title Page:

At field (56), Other Publications, please add -- "Dirty Service Anti-Cavitation Trim (DST)," Product Bulleting (showing product publicly available since 1997). --.

In the Specification:

At Column 3, line 52, "angle a and" should be -- angle $\alpha$ and --.

Signed and Sealed this

Third Day of July, 2007

JON W. DUDAS
*Director of the United States Patent and Trademark Office*